Dec. 19, 1961    W. D. RIGGS    3,014,141
SYNCHRONOUS MOTOR AND ROTOR
Filed March 9, 1959
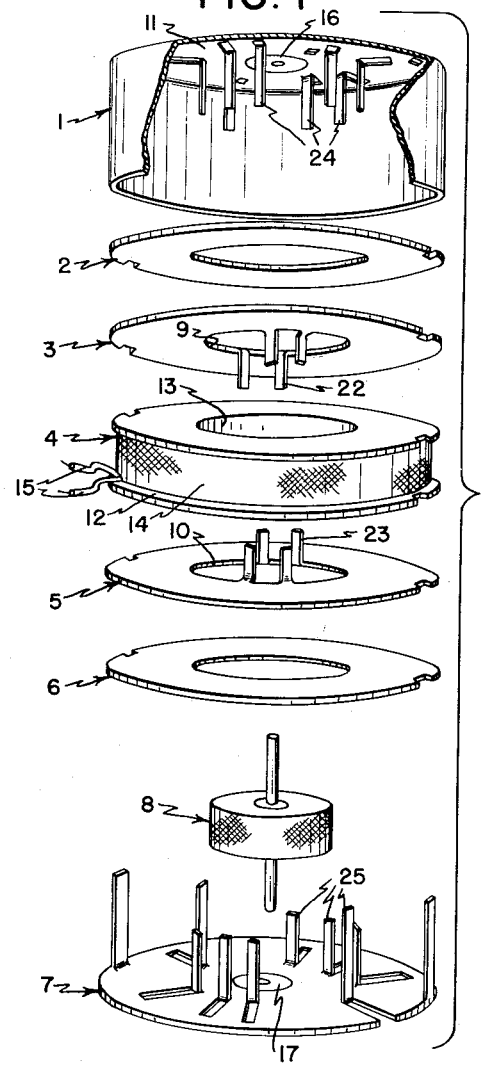
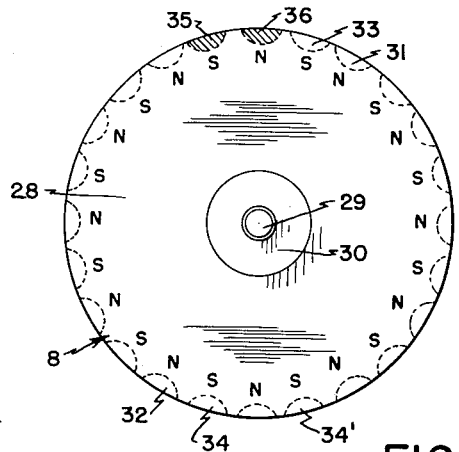
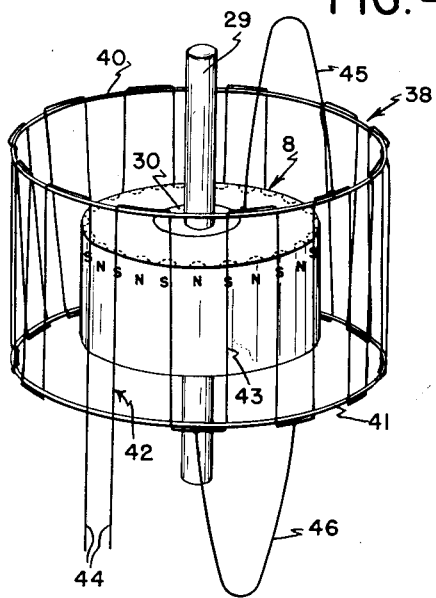
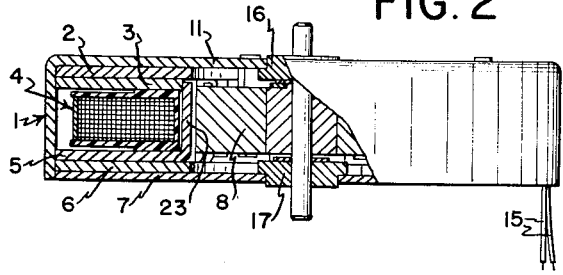
INVENTOR
William D. Riggs
BY
*Rennie, Edmunds, Morton,*
*Benoway & Taylor* ATTORNEYS United States Patent Office 3,014,141
Patented Dec. 19, 1961

3,014,141
SYNCHRONOUS MOTOR AND ROTOR
William D. Riggs, Woodbury, Conn., assignor to Consolidated Electronics Industries Corp., Waterbury, Conn., a corporation of Delaware
Filed Mar. 9, 1959, Ser. No. 798,199
15 Claims. (Cl. 310—156)

This invention relates to synchronous motors and more particularly to an improved non-salient pole rotor for synchronous motors. Additionally, the invention relates to the combination of this novel non-salient pole rotor and a stator structure of which I was the co-inventor with Loisius J. A. Van Lieshout and which is described in our co-pending application entitled "Synchronous Motor," Serial No. 571,632, filed March 15, 1956.

The synchronous motor described and claimed in the above-identified co-pending application has unidirectional starting characteristics which are greatly improved over those of previously known synchronous motors. Moreover, a motor which incorporates the invention described in the co-pending application has substantially greater torque than previously known synchronous motors of the same size. It has been found, however, that the manufacturing tolerances necessary to quantity production of the motor described in the co-pending application cause variations in the stator structure and the rotor which unavoidably and very occasionally combine in one motor in such a way that the rotor will not always start in the intended direction from every angular position of the rotor with respect to the groups of shaded and unshaded poles of the stator. This condition occurs in only a very few motors coming off the production line and even in these motors there are only one or two unique positions of the rotor with respect to the poles of the stator structure from which the rotor may unpredictably start in either the intended direction or in the reverse direction.

I have found that this difficulty may be overcome without any mechanical modification of the motor described in the co-pending application and without changing or detracting from the other advantageous features of that motor in any substantial respects.

According to my invention I provide, in a motor such as that described in the co-pending application, a non-salient pole rotor which is in all mechanical respects identical with the rotor described there, but which has its magnetic properties changed by the very simple expedient of magnetizing at least one of the non-salient poles of the rotor to a different intensity from that of the other poles induced in the rotor. Thus, the rotor is formed from a disc-shaped or cylindrical-shaped body of ferrite material having induced in the periphery thereof at substantially equiangularly spaced locations a plurality of magnetic poles. All but at least one of these poles comprise regions of the rotor in which the ferrite material has been magnetically oriented to the same extent to have the desired magnetic intensity. The material in adjacent ones of these regions is oppositely oriented so as to form rotor poles of opposite magnetic polarity.

According to my invention at least one of the regions consists of material which is oriented to a different extent to form one or more rotor poles having magnetic intensity which is different from that of the rotor poles otherwise provided. The magnetic intensity of the one or more different regions may be greater or less than that of all the other regions or the region or regions may simply be left unmagnetized.

The function of a non-salient pole rotor modified in accordance with the present invention may be readily understood if one visualizes a stator structure incorporating the invention of the above-identified co-pending application. In particular, consider a stator structure in which there are two diametrically opposed groups of shaded poles and two diametrically opposed groups of unshaded poles. An ideal motor according to that invention has flux magnitudes, electrical phase angles and physically displaced stator poles arranged so that all torque components acting on a conventional non-salient pole rotor and tending to cause the rotor to turn in the undesired direction are canceled out. According to the terminology of that application the positive-going shaded torque component cancels the positive-going unshaded torque component, whatever the relative angular position of the rotor with respect to the stator. On the other hand, the negative-going torque components, both shaded and unshaded, combine vectorally to provide a resultant negative-going torque which causes the rotor to turn in the desired direction. In the event that this "ideal" is not realized in a particular motor, whether due to manufacturing irregularities or otherwise, and either the shaded or the unshaded torque components predominate, the unwanted positive-going torque components do not exactly cancel each other. Consequently, there are angular positions of the rotor in relation to the stator where the net torque acting on the rotor may cause it to start rotating in the undesired direction.

Now, consider that at least one of the magnetized regions in the periphery of the rotor is, in accordance with the present invention, magnetized to a different extent than all the other regions or is left unmagnetized. It will be seen that even though the rotor starts in the wrong direction due to an unbalanced positive-going torque the rotor will turn at most one quarter of a revolution before it passes from under, for example, shaded poles and will encounter a reverse torque which will immediately cause the rotor to reverse its direction and rotate in the desired direction.

A feature of the present invention is that unidirectional starting and running of synchronous motors such as that disclosed in the above-identified co-pending application is assured under all conditions without the addition of any mechanical unidirectional devices such as are frequently utilized in conventional synchronous motors. moreover, neither mechanical, electrical nor magnetic modifications of the stator structure are required.

Another feature of the present invention is that the mechanical symmetry and consequent dynamic and static balance of the ferrite non-salient pole rotor is not altered at all. Thus, the freedom from vibration which is characteristic of a reasonably accurately centered disc or cylinder is preserved.

A further feature of the present invention is its utter simplicity. No equipment not otherwise required in the manufacture of motors incorporating the invention of the co-pending application is required. Only slight modification of the ordinary equipment need be made.

In the following description the details of several embodiments of the invention are given in full together with the details of a method of manufacturing a rotor incorporating the invention. In the course of the description reference is made to the accompanying drawing, in which:

FIG. 1 is an exploded view in perspective showing the several parts of a synchronous motor and illustrating the relative positions of the parts;

FIG. 2 is a side elevation partly in section of the motor of FIG. 1 after assembly;

FIG. 3 is a side elevation taken along the axis of rotation of a rotor according to this invention; and FIG. 4 is a schematic view of apparatus for inducing the magnetized regions of the rotor shown in FIG. 3.

In the following description I will only briefly describe the stator structure of the motor according to the present invention inasmuch as the stator structure is identical in all respects with the stator structure described in the above-identified co-pending application. For a complete description of that stator structure attention is directed to the co-pending application. It should be borne in mind that the motor described in that application and in this application was designed to operate on 115 volts, 50-60 cycle alternating current at 300 r.p.m. The power consumption of this motor is approximately 2-3 watts. Therefore, certain of the limitations which may appear in connection with this particular embodiment are not necessarily limitations on the invention of which this embodiment is only illustrative.

In FIGS. 1 and 2, the motor comprises as principal components a cup-shaped motor housing 1 of a magnetic metallic material, a first washer-shaped non-magnetic metallic shading ring or coil 2, a first magnetic metallic washer-shaped pole member 3, an alternating current field coil 4, a second washer-shaped magnetic metallic pole member 5, a second washer-shaped non-magnetic metallic shading ring or coil 6 and a disc-shaped magnetic metallic housing closure 7 which also serves as a second shaded pole member.

The motor also comprises a novel non-salient pole rotor 8. It is this component of the motor which is specifically different from the rotor described in the above-identified co-pending application. Its structure according to the present invention and its outstanding features will presently be described in detail.

The alternating current field coil 4 consists of a form 12 of molded plastic having a central aperture 13. The coil is bobbin wound on the form, the annular windings 14 having a rectangular cross-section and comprising in this particular embodiment about 5,000 turns of insulated No. 14 copper wire. The energizing leads for connecting the coils to a suitable source of alternating current are indicated at 15.

The central aperture 13 of the coil form is circular and has a diameter which is somewhat greater than the diameter of the rotor 8. The rotor 8 runs within the aperture 13 when the motor is assembled as shown in FIG. 2.

Rotor shaft bearings 16 and 17 of any suitable type are pressed into central apertures in the flat end wall 11 of the housing 1 and in the housing closure 7.

For the purposes of the following description of the magnetic circuit structure of the stator, those elements located above coil 4 in FIG. 2 and including the end member 11 of housing 1, shading ring 2 and pole member 3 will be denominated the north elements while those elements below the coil including the pole member 7, the shading ring 6 and the pole member 5 will be denominated the south elements. However, it will be understood that in an alternating current motor, such as this, the elements will not continuously be of one polarity, but will be changing in accordance with the frequency of the energizing current.

The central apertures 9, 10, in the unshaded pole members 3 and 5 have diameters which are substantially the same as the diameter of the central aperture 13 in the coil form 12. There are fixed to the peripheries of the apertures 9, 10, respectively, elongated poles 22 and 23 which extend normally from the plane of the washer-shaped members. In general, poles 22 and 23 on the members 3 and 5 are so located and of such length that when the members are assembled on the coil as shown in FIG. 2 the poles 22 and 23 will interlace with each other. Thus, there will be spaced around the surface of the coil aperture 13 alternately a pole 22 and then a pole 23 follows by another pole 22 and another pole 23.

As previously stated, the members 11 and 7 which constitute the north and south shaded pole members are also made of a magnetic metallic material such as cold rolled steel. The member 11 is provided with a plurality of poles 24 and the member 7 has an equal number of poles 25. In each case the poles are attached at one end to their respective shaded pole members and extend normally from the plane thereof. These poles 24 and 25 are spaced about the circumferences of circles which are concentric with the bearings 16 and 17 and have diameters substantially the same as the diameter of the aperture 13 in the coil form 12. The angular spacing of these poles is such that in the assembled rotor they will interlace with each other.

As described in the above-identified co-pending application, the stator is provided with a greater number of shaded poles than unshaded poles and these shaded and unshaded poles are segregated into separate groups around the stator. The unshaded poles 22 and 23 extending from the members 3 and 5 are alternately interlaced with each other and are arranged in two diametrically opposed groups, each group comprising four uniformly spaced north and south unshaded poles. Similarly, there are eight shaded poles 24 and 25 extending from each of the members 11 and 7. These are arranged in two diametrically opposed groups and, as is evident in FIG. 1, a group of eight interlaced north and south shaded poles will lie between the diametrically opposed groups of interlaced unshaded poles. Each of the groups of unshaded poles will comprise two north poles and two south poles, four in all.

As is also explained in the co-pending application, the two groups of shaded poles are physically shifted along the stator in the direction of flux shift due to shading. This is also the direction of the desired rotor rotation. The amount by which the shaded poles are shifted with respect to the unshaded poles is such as to provide maximum attenuation of those components of the total flux which are in a direction opposed to the desired rotation of the rotor. The consequence of this is that the instantaneous relation of the rotational flux components is such that the maximum value of the resultant unidirectional rotating flux will be attained when the shaded pole groups are displaced in the direction of desired rotor rotation by an angle, expressed in electrical degrees, which is the supplement of the phase lag angle, also expressed in electrical degrees. For example, if the phase shift of the flux in a shaded pole with respect to the flux in the unshaded poles is 45 electrical degrees—about the maximum which it is possible to obtain as a practical matter—then the shaded pole groups should be displaced by 135 electrical degrees. Thus, the displacement of the shaded pole group is a function of the phase lag due to shading that is obtainable in any particular construction of such a motor. It will be understood that optimum results are obtained if the combination of these displacements is approximately 180 degrees, but that variations in either or both of the factors within the range of plus or minus 15 to 20 degrees will still give satisfactory results.

In accordance with the present invention, I provide a rotor, indicated at 8 in FIGS. 1 and 2, and shown in enlarged view in FIG. 3. This rotor comprises a cylindrical annulus of a ferrite material which is an isotropic, ceramic, magnetic form of ferrite having a relatively low specific gravity, a permeability approximately equal to that of air, namely, $\mu=1$, and a very high coercivity. A commercially obtainable product of this kind is known as "Magnadur" and is manufactured by the Ferroxcube Corporation of America. "Magnadur" has a specific gravity of 4.5 which results in relatively low rotor inertia, a desirable feature in motors of this kind. This rotor material is also, most significantly for this application, a magnetically "hard" material; that is, it has a very high value of coercivity which is approximately 1600 oersteds. This permits the placing of poles of opposite polarity adjacent to each other on the periphery of the rotor to form a non-salient pole type of rotor.

Equally significant from the standpoint of the performance obtained from motors of this kind is the fact that the permeability of "Magnadur" is approximately equal to the permeability of air. This property of the material, together with other features of the invention, are used to assist in obtaining optimum flux distribution in the magnetic circuits of the motor under starting and running conditions. As will be apparent to those skilled in the art, rotors made from ferrite materials having permeability much greater than that of air introduce flux paths having low reluctance with respect to the reluctance of the stator rotor air gap and these act as undesirable shunts for the flux.

The rotor is constructed of an annulus of the ferrite material designated 28 in FIG. 3. A shaft 29 is made of any suitable material and has its central portion knurled or made non-circular. The annulus and the shaft are inserted in a suitable jig to hold them in accurate coaxial alignment with the knurled portion of the shaft within the central aperture of the annulus. While the shaft and the annulus are thus aligned, a thermosetting material 30 of any suitable type is poured into the aperture and allowed to set. By this means a unitary assembly is formed which is at once economical and simple and which is free of static and dynamic unbalance. The knurled or non-circular part of the shaft prevents the annulus from turning on the shaft.

Now, according to this invention, a plurality of diametrically opposed poles for the rotor are induced in the periphery of the ferrite material by any suitable means. To illustrate the invention I have shown twelve pairs of poles—twenty-four in all—each pair consisting of two north poles, for example, 31, 32, or of two south poles, for example 33, 34, diametrically oppositely situated on the periphery of the rotor. Each of these regions or poles has been schematically indicated in dotted outline as a semi-cylindrical volume with the axis of the volume parallel to the axis of rotation of the rotor. Adjacent areas have been arbitrarily designated N and S to indicate that they are of opposite polarity.

The high coercivity of the ferrite material insures that the magnetic fields to which the rotor is subjected during normal operation of the motor will not disturb the locations of the induced poles nor will it alter their magnetic strengths; furthermore, adjacent poles of opposite polarity will not cause a mutual deterioration.

Now, in accordance with the invention, all but at least one of these regions of opposite polarity are magnetized to substantially the same intensity. The regions magnetized to the same intensity have been left unshaded in FIG. 3. In a preferred embodiment of the rotor according to the invention two adjacent poles 35 and 36 (shown shaded in FIG. 3) of opposite polarity are magnetized to only about 50 percent of the intensity of all the other poles of the rotor. Thus, if all the poles other than 35 and 36 have been magnetized to the maximum extent possible the torque which the rotor is capable of developing in cooperation with a given stator will not be reduced to any substantial degree due to the reduction of the intensity of only two of the twenty-four poles.

An alternative to the preferred embodiment would be one in which all but at least one of the rotor poles are magnetized to substantially the same extent, although not to the maximum possible extent, and the two adjacent poles 35 and 36 are magnetized to a substantially greater intensity than are the other poles.

A further modification of the preferred embodiment is one in which the two poles of different magnetic intensity are not immediately adjacent poles, but are, for example, a north pole such as 36 in FIG. 3 and a south pole 34 or 34' situated at 165 degrees in either the clockwise or counterclockwise direction from the north pole 36. Of course, in a modification of this kind, the two poles of different intensity may actually be magnetized to a lesser intensity or to a greater intensity than all the other poles. This will be clear from a consideration of the modifications suggested above.

A further modification, although not equally effective in all cases, is one in which only one pole, for example the north pole 36 in FIG. 3, is magnetized to a different intensity than are all the other poles. Again, the single different pole may be magnetized to a substantially greater or a substantially lesser intensity than all the other poles.

FIG. 4 illustrates one practical way to induce the magnetically oriented regions which constitute the poles of the rotor. The ferrite annulus is placed within a fixture generally indicated at 38. This consists of a top ring 40 and a bottom ring 41, both of which are formed of insulating material. These are suitably supported in coaxial spaced relation as shown. Heavy conductive wire 42 is looped about the top and bottom rings a sufficient number of times so that there are as many individual spans 43 of wire between the rings as there are poles to be formed in the periphery of the rotor. For the twenty-four pole rotor shown in FIG. 3 there should be twenty-four spans. As shown, the loops of wire should be formed so that each span of wire between the rings is substantially parallel to the axis of the fixture and so that all the spans are at equally spaced locations about the rings. The leads 44 are provided for connecting the wire which forms the loops to a suitable source of direct current which is capable of supplying relatively high current for short periods of time.

It will be understood that when current is passed through the wire forming the loops the strong magnetic fields set up around the individual spans of wire will cause the rotor material within the influence of the field to become magnetically aligned along the lines of force of the fields. Inasmuch as the current is oppositely directed in adjacent spans, i.e. if it is assumed that the current in one span is downward, the current in an adjacent span will be upward, the magnetic fields created by adjacent spans will be oppositely directed. Accordingly, the portions of the rotor material under the influence of these fields will be magnetically aligned in opposite directions, thereby forming rotor poles of opposite polarity.

To provide the two poles of lesser magnetic intensity as in the preferred embodiment described in connection with FIG. 3 I provide shunting loops 45 and 46. As seen in FIG. 4 the shunting loop 45 is connected between adjacent loops of wire at the places where they pass over, or are otherwise attached to, the top ring 40 and the shunting loop 46 is similarly attached to places where adjacent loops pass under or are otherwise attached to the bottom ring 41. The shunting loops should extend away from the rotor so that the magnetic field due to the current in the shunting loops does not influence the rotor material or alter the fields due to the currents in the spans. If, as in the preferred embodiment, the magnetic intensity of the two different poles 35 and 36 is to be substantially 50 percent of the intensity of all the other rotor poles, the resistance of the shunting loops should be proportioned to the resistance of the magnetizing loops so that approximately half of the magnetizing current is diverted through the shunting loops while the other half of the current remains in the magnetizing loops. Of course, the resistance of a shunting loop will be dependent upon the specific resistance of the material itself and upon the length of the loop and may be varied by varying either or both of these factors. Those skilled in the art will also recognize that the degree of magnetic orientation induced in the pole regions of the rotor will not, in general, be directly proportional to the current. The relation between these factors is given for the particular magnetization curve which is characteristic of the rotor material.

The modifications of the rotor magnetizing fixture so that it will magnetize the rotor in accordance with the modified rotors described above will be obvious to those skilled in the art and need not be described here.

Even though I have described certain specific embodiments of the invention I do not propose that the invention be limited to the details of those specific embodiments. The invention is not necessarily limited to any particular rotor material nor to the construction of the rotor. The invention may be incorporated in a rotor having substantially more or less poles than are shown in FIG. 3. As will be understood by those skilled in the art the number of poles actually provided in a rotor for a particular purpose will be determined at least in part by the speed and torque characteristics which are desired for a particular motor.

I claim:

1. A synchronous motor comprising a stator structure having a plurality of unshaded poles divided into groups spaced from each other about the structure, a plurality of shaded poles divided into groups spaced from each other about the structure, all of said poles being arranged such that a group of shaded poles lies between adjacent groups of unshaded poles, and a rotor adapted to rotate within the congregation of shaded and unshaded poles, said rotor comprising an annular member composed of a magnetizable ferrite material, said member having in the periphery thereof at substantially equiangularly spaced locations a plurality of magnetized regions of which adjacent regions are of opposite magnetic orientation, the material of all but at least one of said regions being magnetized to a substantially uniform extent and the other of said regions being magnetized to a substantially different extent.

2. A synchronous motor comprising a stator structure having a plurality of unshaded poles divided into groups spaced from each other about the structure, a plurality of shaded poles divided into groups spaced from each other about the structure, all of said poles being arranged such that a group of shaded poles lies between adjacent groups of unshaded poles, and a rotor adapted to rotate within the congregation of shaded and unshaded poles, said rotor comprising an annular member composed of a magnetizable ferrite material, said member having in the periphery thereof at substantially equiangularly spaced locations a plurality of magnetized regions, all but two of said regions being magnetized to a substantially uniform extent and immediately adjacent magnetized regions being of opposite magnetic orientation.

3. A synchronous motor according to claim 2, in which the said two regions are adjacent regions on the periphery of said rotor.

4. A synchronous motor according to claim 2 and in which the said two regions are regions which are angularly spearated from each other by less than 180 degrees on the periphery of the rotor.

5. A synchronous motor according to claim 2 and in which the said two regions are of opposite magnetic orientation and are separated from each other by less than 180 degrees on the periphery of the rotor.

6. A synchronous motor according to claim 2 and in which the said two regions are magnetized to a substantially lesser extent than the other of said regions and are of opposite magnetic orientation and are separated by less than 180 degrees on the periphery of the rotor.

7. A synchronous motor comprising a pair of pole assemblies each having an unshaded pole member, a shaded pole member and means for delaying the change of magnetic flux in said shaded pole member with respect to change in flux in said unshaded pole member, a field coil constructed and arranged to act as a source of magnetomotive force for said pole assemblies when energized by an alternating current, said unshaded pole members each having at least two spaced groups of a number $m$ of poles interlacing with the poles of the other unshaded pole member, said shaded pole members each having at least two spaced groups of a number $n$, different from $m$, of poles interlacing with the poles of the other shaded pole member, the interlaced groups of shaded poles lying in the spaces between the interlaced groups of unshaded poles and a non-salient pole rotor mounted for rotation within the congregation of poles, which rotor comprises an annular member composed of a magnetizable ferrite material, said member having in the periphery thereof a plurality of magnetized regions of which adjacent regions are of opposite magnetic orientation, the material of all but at least one of said regions being magnetized to a substantially uniform extent and the other of said regions being magnetized to a substantially different extent.

8. A synchronous motor comprising a pair of pole assemblies each having an unshaded pole member, a shaded pole member and means for delaying the change of magnetic flux in said shaded pole member with respect to change in flux in said unshaded pole member, a field coil constructed and arranged to act, when energized by an alternating current, as a source of magnetomotive force for said pole assemblies, said unshaded pole members each having at least two spaced groups of a number $m$ of poles interlacing with the poles of the other unshaded pole member, said shaded pole members each having at least two spaced groups of a number $n$, different from $m$, of poles interlacing with the poles of the other shaded pole member, the interlaced groups of shaded poles lying in the spaces between the interlaced groups of unshaded poles and a non-salient pole rotor mounted for rotation within the congregation of poles, which rotor comprises an annular member composed of a magnetic ferrite material, said member having induced in the periphery thereof a plurality of substantially equiangularly distributed, limited regions of uniformly magnetically oriented material, adjacent regions being of opposite magnetic orientation, and two of said regions having substantially less magnetic intensity than all other of said regions.

9. A synchronous motor comprising a pair of pole assemblies each having an unshaded pole member, a shaded pole member and means for delaying the change of magnetic flux in said shaded pole member with respect to change in flux in said unshaded pole member, a field coil constructed and arranged to act as a source of magnetomotive force for said pole assemblies when energized by an alternating current, said unshaded pole members each having at least two spaced groups of a number $m$ of poles interlacing with the poles of the other unshaded pole member, said shaded pole members each having at least two spaced groups of a number $n$, different from $m$, of poles interlacing with the poles of the other shaded pole member, the interlaced groups of shaded poles lying in the spaces between the interlaced groups of unshaded poles and a non-salient pole rotor mounted for rotation within the congregation of poles, which rotor comprises an annular member composed of a magnetizable ferrite material, said member having in the periphery thereof at substantially equiangularly spaced locations a plurality of magnetized regions of which adjacent regions are of opposite magnetic orientation, the material of all but two of said regions being magnetized to a substantially uniform extent and the other of said regions being magnetized to a substantially lesser extent.

10. A non-salient pole rotor for a synchronous motor which rotor comprises an annular member composed of a magnetizable ferrite material, said member having in the periphery thereof at substantially equiangularly spaced locations a plurality of magnetized regions, all but at least one of said regions being magnetized to a substantially uniform extent, and immediately adjacent regions being of opposite magnetic orientation.

11. A non-salient pole rotor for a synchronous motor which rotor comprises an annular member composed of a magnetizable ferrite material, said member having in the periphery thereof at substantially equiangularly spaced locations a plurality of magnetized regions, all but two of said regions being magnetized to a substantially uniform extent, and immediately adjacent regions being of opposite magnetic orientation.

12. A non-salient pole rotor according to claim 11, in which the said two regions are adjacent regions on the periphery of said rotor.

13. A non-salient pole rotor according to claim 11, in which the said two regions are regions which are angularly separated from each other by less than 180 degrees on the periphery of the rotor.

14. A non-salient pole rotor according to claim 11, in which the said two regions are of opposite magnetic orientation and are separated from each other by less than 180 degrees on the periphery of the rotor.

15. A non-salient pole rotor according to claim 11 and in which the said two regions are magnetized to a substantially lesser extent than the other of said regions and are of opposite magnetic orientation and are separated by less than 180 degrees on the periphery of the rotor.

No references cited.